G. H. BRYANT.
CAR WHEEL AND METHOD OF MANUFACTURE.
APPLICATION FILED JAN. 31, 1908.
924,314.
Patented June 8, 1909.
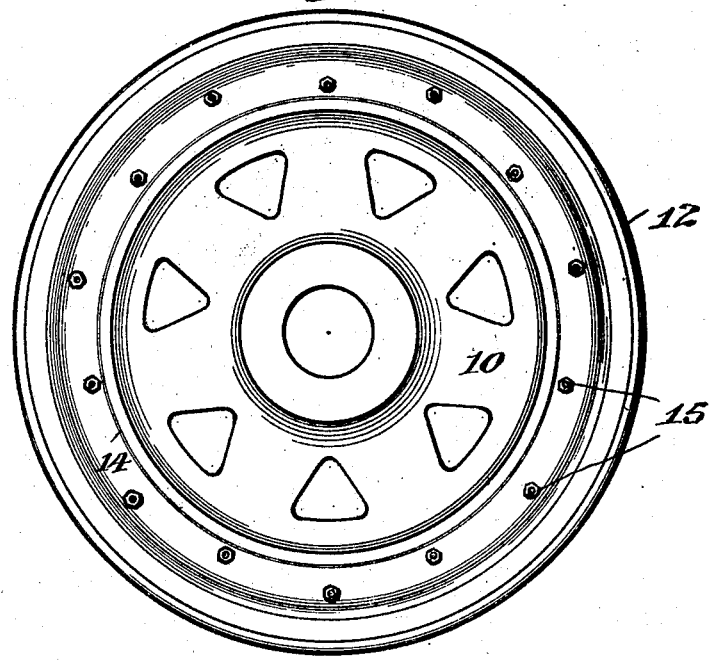

UNITED STATES PATENT OFFICE.

GEORGE H. BRYANT, OF CHICAGO, ILLINOIS.

CAR-WHEEL AND METHOD OF MANUFACTURE.

No. 924,314.

Specification of Letters Patent.

Patented June 8, 1909.

Application filed January 31, 1908. Serial No. 413,595.

*To all whom it may concern:*

Be it known that I, GEORGE H. BRYANT, a citizen of the United States, residing at Chicago, in the county of Cook and State of Illinois, have invented certain new and useful Improvements in Car-Wheels and Methods of Manufacture, of which the following is a specification.

It has been proposed heretofore to use a paper or cardboard insert, filler, or separator between the periphery of the main body of a car wheel and its tire to act as a noise insulator, deadener, or absorber, whereby the noise of the operation of the car will be greatly reduced and will not reach the ears of passengers or others to any great extent. I have found by test, however, that in large and heavy cars it is difficult to obtain a cardboard or paper insert which possesses a sufficient crushing strength to withstand the strain to which it is subjected. It has been customary heretofore to press these paper or cardboard separators or fillers into shape and then assemble the parts of the wheel, bolting the tire to the center or main body of the wheel. Difficulty has sometimes been experienced in securing a perfect fit between the paper or cardboard and the wheel and/tire. I have discovered that both of these difficulties may be overcome by using a non-resonant metallic filler or separator, poured while in a molten condition into the cavity or recess between the wheel body and its tire, the latter being somewhat heated so that when it cools the metal separator or filler will have a perfect fit with both the wheel and tire. Lead is especially adapted for this use because it is non-resonant or non-resounding to a considerable degree and is readily melted at a low temperature. It also has the property of retaining heat for a considerable time so that it will flow readily into the comparatively small space between the tire and wheel and completely fill the same.

On the accompanying drawing, forming a part of this specification, I have illustrated an embodiment of my invention, and on this drawing—Figure 1 is a side elevation of one of my improved car wheels; Fig. 2 is an enlarged section through the tire and a portion of the main body of the wheel showing the separator or filler; and Fig. 3 is a view similar to Fig. 2, the section being taken adjacent to one of the bolts which binds or fastens the tire to the wheel proper.

Referring to the drawing, it will be noticed that the wheel has the usual main body or center 10 equipped with a stepped periphery 11. A tire 12 is also provided with an internal circular stepped surface 13 corresponding to but of slightly greater diameter than the surface 11 of the wheel proper, whereby when the tire is placed concentrically with the wheel body a space is left between the two extending completely around the wheel. The tire 12 is heated and then placed concentric to the wheel or body 10, and during this condition of the tire molten lead, or other non-resonant metal, 14, is poured into the annular space between the tire and wheel. As the lead or other metal cools and contracts the tire also correspondingly contracts so that a perfect fit is secured between the parts when all are cooled. This metal separator or filler is not intended to act as a binder to hold the tire in place, the latter being held in position by a plurality of bolts 15 passing through holes in the wheel, separator, and tire, as is clearly illustrated in Fig. 3. Molten lead has the property of retaining its heat for a considerable period of time, and for that reason it will readily flow into the restricted and narrow recess or space between the tire and wheel body, completely filling the same.

Lead and some other metals possess the property of not transmitting or responding readily to sound vibrations directed against them. In other words, they may be called non-resounding, non-resonant, or non-vibratory. Owing to this property of the metal separator it acts as a sound insulator, deadener, or absorber, whereby the noise and sound of one part of the wheel, such as the rim, is not transmitted to any appreciable extent through the separator to the main body or center of the wheel and to the car proper. The paper inserts or separators which have heretofore been used for this purpose are found to be unsatisfactory and unreliable when employed in heavy cars because they do not possess sufficient crushing strength. They, therefore, break away or are compressed in the operation of the car so that they lose the very qualities for which they were used in the car wheels. Lead and a few other metals possess an adequate crushing strength and also have the non-resonant or non-resounding quality desired.

I have referred to the fact that metals other than lead might be used for this purpose, and, as an example, I might mention copper, but the use of this metal is of course objectionable because of its greater cost. The exact shape and form of the non-resonant metal separator is quite immaterial, and, although I have shown one of a specific shape, it is to be understood that this invention is in no wise limited to such a construction. It will be apparent, therefore, that various changes may be made in the car wheel structure shown and described without departure from the essence or heart of my invention.

I claim:

1. In a car wheel, the combination of a main body or center, a tire, and a lead separator or filler between said main body and tire, substantially as described.

2. The method of applying a non-resonant separator or filler between the main body of a car wheel and its tire, which consists in heating the tire and placing it concentric to the main body of the wheel, whereby a space or cavity is left between them, pouring molten non-resonant metal into said space or cavity whereby the same is filled therewith, and allowing the parts to become cooled, substantially as described.

3. The method of applying a non-resonant filler or separator between the main body of a car wheel and its tire, which consists in heating the tire and placing it concentric to the wheel whereby a space or cavity is left between them, pouring molten lead into said space or cavity filling the same, and allowing the parts to become cooled, substantially as described.

GEORGE H. BRYANT.

Witnesses:
   WALTER M. FULLER,
   L. F. MCCREA.